(12) United States Patent
Perez et al.

(10) Patent No.: US 11,731,408 B2
(45) Date of Patent: Aug. 22, 2023

(54) MULTILAYER FILM AND METHOD OF MAKING THE SAME

(71) Applicant: 3M INNOVATIVE PROPERTIES COMPANY, St. Paul, MN (US)

(72) Inventors: Mario A. Perez, Burnsville, MN (US); Mary E. Johansen, Woodbury, MN (US); Sebastian Goris, Inver Grove Heights, MN (US); Lesbia E. Giron, Roseville, MN (US); Rajdeep S. Kalgutkar, Woodbury, MN (US); Ta-Hua Yu, Woodbury, MN (US); Paul T. Hines, St. Paul, MN (US); Stephen A. Johnson, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/639,708

(22) PCT Filed: Sep. 18, 2020

(86) PCT No.: PCT/IB2020/058727
§ 371 (c)(1),
(2) Date: Mar. 2, 2022

(87) PCT Pub. No.: WO2021/059101
PCT Pub. Date: Apr. 1, 2021

(65) Prior Publication Data
US 2022/0347982 A1    Nov. 3, 2022

Related U.S. Application Data

(60) Provisional application No. 62/906,477, filed on Sep. 26, 2019.

(51) Int. Cl.
*B32B 27/08*    (2006.01)
*B32B 7/022*    (2019.01)
(Continued)

(52) U.S. Cl.
CPC .............. *B32B 27/08* (2013.01); *B32B 7/022* (2019.01); *B32B 27/308* (2013.01); *B32B 27/32* (2013.01);
(Continued)

(58) Field of Classification Search
CPC ............ B32B 2250/03; B32B 2250/05; B32B 2250/24; B32B 2250/40; B32B 2262/108;
(Continued)

(56) References Cited

U.S. PATENT DOCUMENTS 3,242,141 A    3/1966    Vertaik
3,377,303 A    4/1968    Feerman
(Continued)

FOREIGN PATENT DOCUMENTS

EP    1475308    11/2004
JP    2012-233019 A    11/2012
(Continued)

OTHER PUBLICATIONS

Johnson, "Fatty Acids in Industry: Processes, Properties, Derivatives, Applications", Chapter 7, Marcel Dekker, Inc., 1989, pp. 153-175.
(Continued)

*Primary Examiner* — Lawrence D Ferguson
(74) *Attorney, Agent, or Firm* — Thomas M. Spielbauer

(57) ABSTRACT

A multilayer film comprises first, second, and third layers. The first layer comprises at least one aromatic polyester, and has a loss modulus at 1 hertz and 25° C. of at least 70 megapascals. The second layer is thermoplastic and has a loss modulus at 1 hertz and 25° C. of less than or equal to 60 megapascals and comprises a thermoplastic elastomer and a polyamide. The third layer contacts the second layer opposite the first layer and has a loss modulus at 1 hertz and 25° C. of at least 70 megapascals. The second layer is
(Continued)

sandwiched between the first and third layers. A method of making the multilayer film by coextrusion is also disclosed.

14 Claims, 1 Drawing Sheet

(51) Int. Cl.
  *B32B 27/30* (2006.01)
  *B32B 27/32* (2006.01)
  *B32B 27/34* (2006.01)
  *B32B 27/36* (2006.01)
(52) U.S. Cl.
  CPC .............. *B32B 27/34* (2013.01); *B32B 27/36* (2013.01); *B32B 2250/24* (2013.01); *B32B 2250/40* (2013.01); *B32B 2270/00* (2013.01); *B32B 2274/00* (2013.01); *B32B 2307/412* (2013.01); *B32B 2307/414* (2013.01); *B32B 2307/51* (2013.01); *B32B 2307/516* (2013.01); *B32B 2307/518* (2013.01); *B32B 2307/54* (2013.01); *B32B 2307/5825* (2013.01); *B32B 2307/732* (2013.01); *B32B 2535/00* (2013.01)
(58) Field of Classification Search
  CPC ........ B32B 2264/102; B32B 2264/104; B32B 2270/00; B32B 2274/00; B32B 2307/412; B32B 2307/414; B32B 2307/51; B32B 2307/516; B32B 2307/518; B32B 2307/54; B32B 2307/5825; B32B 2307/732; B32B 25/16; B32B 2535/00; B32B 2571/00; B32B 27/08; B32B 27/20; B32B 27/285; B32B 27/302; B32B 27/306; B32B 27/308; B32B 27/32; B32B 27/34; B32B 27/36; B32B 27/40; B32B 7/022

See application file for complete search history.

(56) References Cited

U.S. PATENT DOCUMENTS

| | | | |
|---|---|---|---|
| 3,448,183 | A | 6/1969 | Chisholm |
| 3,483,237 | A | 12/1969 | Peerman |
| 3,555,128 | A | 1/1971 | Schrenk |
| 3,565,985 | A | 2/1971 | Schrenk |
| 3,595,887 | A | 7/1971 | Kulkarni |
| 4,405,547 | A | 9/1983 | Koch |
| 6,312,823 | B1 | 11/2001 | El-Afandi |
| 6,855,402 | B2 | 2/2005 | Rabinovitch |
| 2009/0104424 | A1 | 4/2009 | Manrique |
| 2016/0001914 | A1 | 1/2016 | Yamamoto |
| 2018/0305544 | A1 | 10/2018 | Perez |

FOREIGN PATENT DOCUMENTS

| | | |
|---|---|---|
| WO | WO 2009-014849 | 1/2009 |
| WO | WO 2011-062836 | 5/2011 |
| WO | 2014/126110 A1 | 8/2014 |

OTHER PUBLICATIONS

Kirk-Othmer, "Organic Chemicals: Dimer Acids", Encyclopedia of Chemical Technology, 2014, (ISBN 9780471238966), John Wiley and Sons, pp. 1-13.

Dupaix, "Finite strain behavior of poly(ethylene terephthalate) (PET) and poly(ethylene terephthalate)-glycol (PETG)", Polymer, 2005, v. 4 6, pp. 4827-4838.

International Search Report for PCT Application No. PCT/IB2020/058727, dated Dec. 22, 2020, 4 pages.

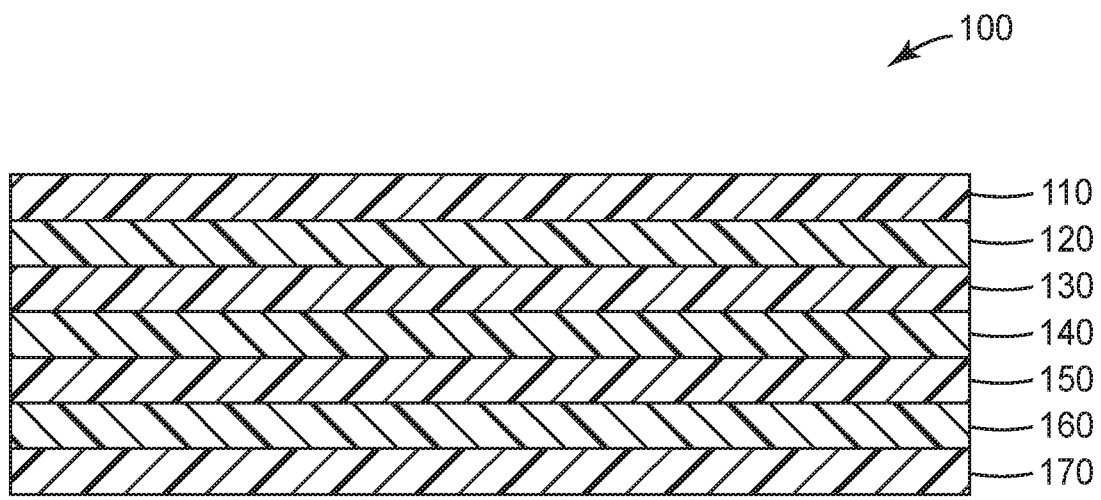

MULTILAYER FILM AND METHOD OF MAKING THE SAME

CROSS-REFERENCE TO RELATED APPLICATIONS

This application is a national stage filing under 35 U.S.C. 371 of PCT/IB2020/058727, filed Sep. 18, 2020, which claims the benefit of U.S. Provisional Application No. 62/906,477, filed Sep. 26, 2019, and the disclosure of which is incorporated by reference in its entirety herein.

TECHNICAL FIELD

The present disclosure broadly relates to multilayer films and methods of making them.

BACKGROUND

Thermoplastic protective films are used in a variety of applications including, for example, as window protection films, vehicle paint protection films, temporary, carpet runners, and electronic display protectors. In some of these applications an adhesive layer is applied to one major surface of the thermoplastic protective film.

For some applications, thermoplastic protective films are thermoformed to provide a specific shape. Thermoforming is a widely used technology in which a plastic film is typically heated and vacuum-drawn into a mold. Exemplary thermoformed films include protective packaging films (e.g., blister packs) used to protect merchandise, dental aligners, battery protection, and smartphone covers.

For these applications and others, there is a continuing need for thermoplastic films that have excellent transparency, low haze, and excellent toughness (e.g., with respect to puncture and tear).

SUMMARY

In the case of multilayer protective films, separation between adjacent layers during use can result in aesthetically and/or mechanically undesirable changes in the films. Advantageously, multilayer films according to the present disclosure may be fine-tuned for transparency, low haze, and toughness (e.g., with respect to puncture and tear) depending on specific application needs, and are resistant to interlayer delamination during use.

In a first aspect, the present disclosure provides a multilayer film comprising:

a first layer, wherein the first layer is thermoplastic, comprises at least one aromatic polyester, and has a loss modulus at 1 hertz and 25° C. of at least 70 megapascals;

a second layer contacting the first layer, wherein the second layer is thermoplastic and has a loss modulus at 1 hertz and 25° C. of less than or equal to 60 megapascals, and comprises:

a thermoplastic elastomer; and a polyamide resin that is a reaction product of:

(i) a dicarboxylic acid, wherein the dicarboxylic acid includes a non-aromatic, dicarboxylic dimer acid and the mole fraction of the non-aromatic, dicarboxylic dimer acid is between from 0.10 to 1.00, based on the total moles of dicarboxylic acid used to form the polyamide resin; and (ii) a diamine, and wherein the polyamide resin is amine-terminated and includes amine end-groups; and a third layer contacting the second layer, wherein the third layer is thermoplastic, comprises at least one aromatic polyester, and has a loss modulus at 1 hertz and 25° C. of at least 70 megapascals; and wherein the second layer is sandwiched between the first and third layers.

In a second aspect, the present disclosure provides a method of making a multilayer film, the method comprising coextruding first, second, and third layers, wherein:

the first layer is thermoplastic, comprises at least one aromatic polyester, and has a loss modulus at 1 hertz and 25° C. of at least 70 megapascals;

the second layer contacts the first layer, and wherein the second layer is thermoplastic and has a loss modulus at 1 hertz and 25° C. of less than or equal to 60 megapascals, and comprises:

a thermoplastic elastomer; and a polyamide resin that is a reaction product of:

(i) a dicarboxylic acid, wherein the dicarboxylic acid includes a non-aromatic, dicarboxylic dimer acid and the mole fraction of the non-aromatic, dicarboxylic dimer acid is between from 0.10 to 1.00, based on the total moles of dicarboxylic acid used to form the polyamide resin; and (ii) a diamine, and wherein the polyamide resin is amine-terminated and includes amine end-groups; and the third layer that is thermoplastic, has a loss modulus at 1 hertz and 25° C. of at least 70 megapascals, and comprises at least one aromatic polyester; and wherein the second layer is sandwiched between the first and third layers.

As used herein, the term "elastomer", refers to an elastic polymer.

As used herein, the term "polymer" encompasses copolymer (e.g., polyester encompasses copolyester).

Loss modulus values referred to herein can be determined according to ASTM Test Method D5026-15 (2015) entitled "Standard Test Method for Plastics: Dynamic Mechanical Properties: In Tension".

Features and advantages of the present disclosure will be further understood upon consideration of the detailed description as well as the appended claims.

BRIEF DESCRIPTION OF THE DRAWINGS

FIG. 1 is a schematic side view of an exemplary multilayer film 100 according to the present disclosure.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The FIGURES may not be drawn to scale.

DETAILED DESCRIPTION

Referring now to FIG. 1, exemplary multilayer film 100 comprises first, second, and third layers (110, 120, and 130, respectively). Second layer 120 is sandwiched between first layer 110 and third layer 130. Optional fourth layer 140 is sandwiched between third layer 130 and fifth layer 150. Optional sixth layer 160 is sandwiched between optional fifth layer 150 and optional seventh layer 170. While not a requirement, in some preferred embodiments, even layers (e.g., layers 120, 140, and 160) have the same composition and odd layers (e.g., layers 110, 130, 150, and 170) all have the same composition.

The odd-numbered (i.e., first, third, fifth, and seventh) layers, which may be the same or different, are thermoplastic have a loss modulus at 1 hertz and 25° C. of at least 70 megapascals (MPa) (e.g., at least 75 MPa, at least 80 MPa, at least 85 MPa, at least 90 MPa, at least 95 MPa, at least 100 MPa, at least 110 MPa, at least 120 MPa, at least 130 MPa, at least 140 MPa, at least 150 MPa, at least 160 MPa, at least 170 MPa, or at least 180 MPa), and each independently comprises at least one aromatic polyester. Exemplary suitable aromatics polyesters include polyethylene terephthalate (PET), polyethylene naphthalate (PEN) (e.g., polyethylene 2,6-naphthalate), and glycol-modified polyethylene terephthalate (PETG).

PET and PEN are widely available from commercial suppliers. PETG is a cyclohexane glycol or other glycol-modified polyethylene terephthalate copolyester produced by polymerizing minor amounts of cyclohexane glycol or other glycol along with ethylene glycol. Other glycols include propylene glycol, diethylene glycol or any other linear low molecular weight other than ethylene glycol. PETG ordinarily is an amorphous polyester of terephthalic acid esterified with a mixture of predominately ethylene glycol and lesser amounts of 1,4-cyclohexanedimethanol. PETG is commercially available from a wide array of commercial manufacturers and suppliers including from Eastman Chemical Company under the trade designation "EASTAR". Particularly useful commercially available PETG polymers include EASTAR 6763 and GN071 available from Eastman Chemical, Kingsport, Tenn. The amount of the component derived from 1,4-cyclohexanedimethanol or other glycol is from about 0.5 to about 20 parts by weight and preferably from about 1 to about 5 parts by weight based on a total 100 weight parts of PETG.

In many preferred embodiments, a blend of PETG and PET, or a blend of PETG and PEN), is used. In some preferred embodiments, a blend of PET or PEN and glycol-modified polyethylene terephthalate in a respective weight ratio of 4:1 to 9:1 is used.

The even-numbered (i.e., second, fourth, and sixth) layers are thermoplastic, have a loss modulus at 1 hertz and 25° C. of less than or equal to 60 MPa (e.g., less than or equal to 55 MPa, less than or equal to 50 MPa, less than or equal to 45 MPa, less than or equal to 40 MPa, less than or equal to 35 MPa, or less than or equal to 30 MPa), each independently comprises a thermoplastic elastomer and a polyamide resin that is a reaction product of: (i) a dicarboxylic acid, wherein the dicarboxylic acid includes a non-aromatic, dicarboxylic dimer acid and the mole fraction of the non-aromatic, dicarboxylic dimer acid is between from 0.10 to 1.00, based on the total moles of dicarboxylic acid used to form the polyamide resin; and (ii) a diamine, and wherein the polyamide resin is amine-terminated and includes amine end-groups.

Exemplary suitable elastomers include at least one of a thermoplastic ionomeric elastomer, a thermoplastic polyurethane elastomer, a thermoplastic polyester elastomer, a thermoplastic polyolefin elastomer (TPO), EP-diene rubber (EPDM) a thermoplastic copolyester elastomer, a thermoplastic polyether block amide elastomer, a styrenic block copolymer elastomer, an elastomeric copolymer of ethylene and propylene (EPR), or an ethylene-vinyl acetate (EVA) elastomer. Elastomers of the foregoing types are widely available in many grades from commercial suppliers.

In some preferred embodiments, the thermoplastic elastomer comprises a styrenic block copolymer elastomer such as, for example, styrene-butadiene-styrene (SBS), styrene-isoprene-styrene (SIS), styrene-(ethylene-butylene)-styrene (SEBS), styrene-(ethylene-propylene)-styrene (SEPS)). Typically these elastomers contain from 10 to 70 percent by weight or more of the non-styrenic monomer. Such polymers are widely available from commercial manufacturers such as for example, Kraton Corp., Houston, Tex., under the trade designation KRATON.

The polyamide resin of the present disclosure is the reaction product of (i) a dicarboxylic acid, wherein the dicarboxylic acid includes a dicarboxylic dimer acid, and the mole fraction of the dicarboxylic dimer acid is between from 0.10 to 1.00, based on the total moles of dicarboxylic acid used to form the polyamide resin; and (ii) a diamine; and wherein the polyamide resin is amine terminated and includes amine end-groups. In some embodiments, the polyamide resin of the present disclosure is the reaction product of (i) a dicarboxylic acid, wherein the dicarboxylic acid includes a non-aromatic, dicarboxylic dimer acid and the mole fraction of non-aromatic, dicarboxylic dimer acid is between from 0.10 to 1.00, based on the total moles of dicarboxylic acid used to form the polyamide resin; and (ii) a diamine; and wherein the polyamide resin is amine terminated and includes amine end-groups. The use of at least 10 mole percent (i.e. a mole fraction of 0.1) of the dimer acid, e.g., non-aromatic dimer acid, imparts unique properties on the resulting polyamide resin. The dimer acid disrupts the structural regularity of the polyamide, thereby significantly reducing or eliminating crystallinity while retaining H-bonding interactions in the resulting polyamide resin. Surprisingly, the polyamide resin of the present disclosure, which include amine termination, functions both as a curative for the curable compositions of the present disclosure and a toughening agent. Although not wishing to be bound by theory, it is thought that the reduction and/or elimination of the crystallinity of the polyamide resin imparts enhanced toughening and flexibility characteristics in the curable compositions of the present disclosure, once they have been cured.

The dicarboxylic acid useful in the synthesis of the polyamide resin of the present disclosure is not particularly limited, except that the dicarboxylic acid, includes a dicarboxylic dimer acid and the mole fraction of the dicarboxylic dimer acid is between from 0.10 to 1.00, based on the total moles of dicarboxylic acid used to form the polyamide resin. The dicarboxylic acid may include at least one alkyl or alkenyl group and may contain 3 to 30 carbon atoms and is characterized by having two carboxylic acid groups. The alkyl or alkenyl group may be branched. The alkyl group may be cyclic. Useful dicarboxylic acids may include propanedioic acid, butanedioic acid, pentanedioic acid, hexanedioic acid, heptanedioic acid, octanedioic acid, nonanedioic acid, decanedioic acid, undecanedioic acid, dodecanedioic acid, hexadecanedioic acid, (Z)-butenedioic acid, (E)-butenedioic acid, pent-2-enedioic acid, dodec-2-enedioic acid, (2Z)-2-methylbut-2-enedioic acid, (2E,4E)-hexa-2,4-dienedioic acid. Aromatic dicarboxylic acids may be used, such as phthalic acid, isophthalic acid, terephthalic acid and 2,6-naphthalenedicarboxylic acid. However, due to their aromatic structure, the aromatic dicarboxylic acids may decrease the flexibility of the polyamide resin, which may limit their utility in some applications. In some embodiments, the dicarboxylic acid contains between from 0 to 30 percent, between from 0 to 20 percent, between from 0 to 10 percent, between from 0 to 5 percent or even between from 0 and 2 percent of an aromatic dicarboxylic acid, based on the total moles of dicarboxylic acid used to form the polyamide resin. An aromatic dicarboxylic acid is defined as a dicarboxylic acid wherein the ratio, $R_C$, of the number of carbon atoms in the aromatic group or groups to the total number of carbon atoms in the dicarboxylic acid is at least 0.25, at least 0.33, at least 0.37, at least 0.42, at least 0.5, at least 0.6 or even higher. For example, terephthalic acid has a total of 8 carbon atoms, 6 being in the aryl group. Hence, the ratio, $R_C$ would equal 0.75. Mixtures of two or more dicarboxylic acid may be used and may be preferred, as mixtures of different dicarboxylic acids will aid in disrupting the structural regularity of the polyamide, thereby significantly reducing or eliminating crystallinity in the resulting polyamide resin.

The dicarboxylic dimer acid useful in the synthesis of the polyamide resin present disclosure is not particularly limited. The dicarboxylic dimer acid may include at least one alkyl or alkenyl group and may contain 12 to 100 carbon atoms, 16 to 100 carbon atoms or even 18 to 100 carbon atom and is characterized by having two carboxylic acid groups. The dimer acid may be saturated or partially unsaturated. In some embodiments, the dimer acid may be a dimer of a fatty acid. The phrase "fatty acid," as used herein means an organic compound composed of an alkyl or alkenyl group containing 5 to 22 carbon atoms and characterized by a terminal carboxylic acid group. Useful fatty acids are disclosed in "Fatty Acids in Industry: Processes, Properties, Derivatives, Applications", Chapter 7, pp 153-175, Marcel Dekker, Inc., 1989. In some embodiments, the dimer acid may be formed by the dimerization of unsaturated fatty acids having 18 carbon atoms such as oleic acid or tall oil fatty acid. The dimer acids are often at least partially unsaturated and often contain 36 carbon atoms. The dimer acids may be relatively high molecular weight and made up of mixtures comprising various ratios of a variety of large or relatively high molecular weight substituted cyclohexenecarboxylic acids, predominately 36-carbon dicarboxylic dimer acid. Component structures may be acyclic, cyclic (monocyclic or bicyclic) or aromatic, as shown below. Note that the dimer acid structure below which includes an aromatic ring would be considered to be a non-aromatic dicarboxylic acid, as $R_C$ would be 0.167.

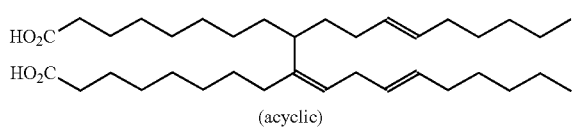
(acyclic)

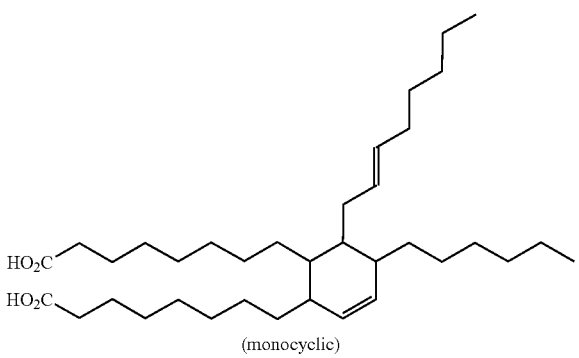
(monocyclic)

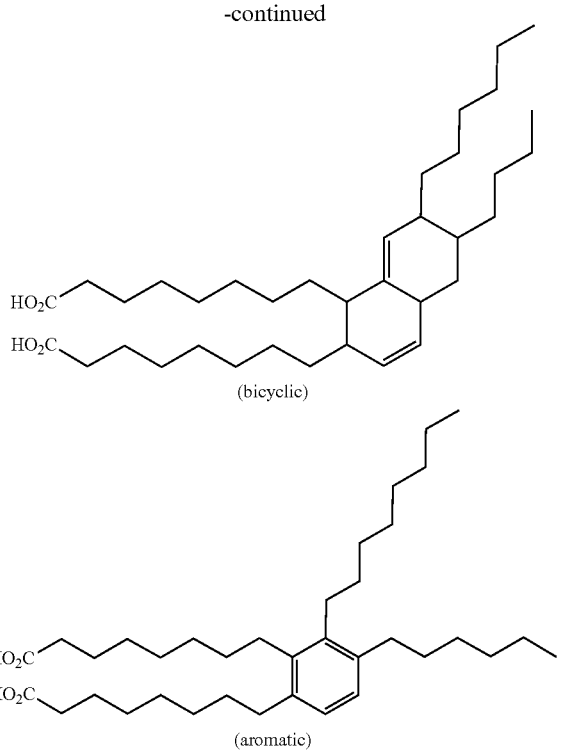
(bicyclic)

(aromatic)

The dimer acids may be prepared by condensing unsaturated monofunctional carboxylic acids such as oleic, linoleic, soya or tall oil acid through their olefinically unsaturated groups, in the presence of catalysts such as acidic clays. The distribution of the various structures in dimer acids (nominally $C_{36}$ dibasic acids) depends upon the unsaturated acid used in their manufacture. Typically, oleic acid gives a dicarboxylic dimer acid containing about 38% acyclics, about 56% mono- and bicyclics, and about 6% aromatics. Soya acid gives a dicarboxylic dimer acid containing about 24% acyclics, about 58% mono- and bicyclics and about 18% aromatics. Tall oil acid gives a dicarboxylic dimer acid containing about 13% acyclics, about 75% mono- and bicyclics and about 12% aromatics. The dimerization procedure also produces trimer acids. The commercial dimer acid products are typically purified by distillation to produce a range of dicarboxylic acid content. Useful dimer acids contain at least 80% dicarboxylic acid, more preferably 90% dicarboxylic acid content, even more preferably at least 95% dicarboxylic acid content. For certain applications it may be advantageous to further purify the dimer acid by color reduction techniques including hydrogenation of the unsaturation, as disclosed in U.S. Pat. No. 3,595,887 (Kulkarni et al.). Hydrogenated dimer acids may also provide increased oxidative stability at elevated temperatures. Other useful dimer acids are disclosed in Kirk-Othmer Encyclopedia of Chemical Technology, Organic Chemicals: Dimer Acids (ISBN 9780471238966), copyright 1999-2014, John Wiley and Sons, Inc. Useful dimer acids contain at least 80% dicarboxylic acid, more preferably 90% dicarboxylic acid content, even more preferably at least 95% dicarboxylic acid content. For certain applications it may be advantageous to further purify the dimer acid by color reduction techniques including hydrogenation of the unsaturation, as disclosed in U.S. Pat. No. 3,595,887 (Kulkarni et al.). Hydrogenated dimer acids may also provide increased oxidative stability at elevated temperatures. Other useful dimer acids are also disclosed in Kirk-Othmer Encyclopedia of Chemical Technology, Organic Chemicals: Dimer Acids (ISBN 9780471238966), copyright 1999-2014, John Wiley and Sons, Inc. Commercially available dicarboxylic dimer acid is available under the trade designation EMPOL1008 and EMPOL1061 both from BASF, Florham Park, N.J. and PRIPOL 1006, PRIPOL 1009, PRIPOL 1013, PRIPOL 1017 and PRIPOL 1025 all from Coroda Inc., Edison, N.J., for example.

In some embodiments, the number average molecular weight of the dicarboxylic dimer acid, e.g., the non-aromatic dicarboxylic dimer acid, may be between from 300 g/mol to 1400 g/mol, between from 300 g/mol to 1200 g/mol, between from 300 g/mol to 1000 g/mol or even between from 300 g/mol to 800 g/mol. In some embodiments, the number of carbon atoms in the dicarboxylic dimer acid, e.g., the non-aromatic dicarboxylic dimer acid, may be between from 12 to 100, between from 20 to 100, between from 30 to 100, between from 12 to 80, between from 20 to 80, between from 30 to 80, between from 12 to 60, between from 20 to 60 or even between from 30 to 60. The mole fraction of dicarboxylic dimer acid, e.g., non-aromatic, dicarboxylic dimer acid, included as the dicarboxylic acid, is between from 0.10 to 1.00, based on the total moles of dicarboxylic acid used to form the polyamide resin. In some embodiments the, mole fraction of dicarboxylic dimer acid, e.g., non-aromatic, dicarboxylic dimer acid, included as the dicarboxylic acid, is between from 0.10 to 1.00, between from 0.30 to 1.00, between from 0.50 to 1.00, between from 0.70 to 1.00, between from 0.80 to 1.00, between from 0.90 to 1.00, between from 0.10 to 0.95, between from 0.30 to 0.95, between from 0.50 to 0.95, between from 0.70 to 0.95, between from 0.80 to 0.95, or even between from 0.90 to 0.95, based on the total moles of dicarboxylic acid used to form the polyamide resin. In some embodiments, the mole fraction of dicarboxylic dimer acid, e.g., non-aromatic, dicarboxylic dimer acid, included as the dicarboxylic acid, is 1.00, based on the total moles of dicarboxylic acid used to form the polyamide resin. Mixtures of two or more dimer acids may be used.

The diamine useful in the synthesis of the polyamide resin of the present disclosure is not particularly limited. The diamines are often alkylenediamines or heteroalkylenediamines. The previously disclosed diamines used in the synthesis of the benzoxazine resin may be used in the synthesis of the polyamide resin. Preferred diamines have the formula $H_2NR''NH_2$ where $R''$ can be a linear or branched aliphatic, cycloaliphatic or aromatic group. $R^{11}$ can also be a polyether linkage such that the diamine belongs to the family of diamines sold under the trade designation "JEFFAMINE" from Huntsman Corp, Salt Lake City, Utah. The diamine can also be an amine terminated butadiene or butadiene-acrylonitrile such as those sold under the trade designation "HYPRO" from CVC Thermoset Specialties, a division of Emerald Performance Materials, Moorestown, N.J. The diamine can also be a dimer diamine such as those sold under the trade designation "PRIAMINE" from Croda, Inc., New Castle, Del. Mixtures of diamines may be used. Aromatic diamines may also be used. However, in some embodiments, the diamine is free of aryl moiety, i.e. the diamine does not contain an aryl moiety. The diamines may be low molecular weight molecules, oligomeric molecules or even low molecular weight polymer molecules. The diamines may be amine terminated polymers, e.g., at least one of amine terminated polyethylene glycol, and amine terminated polypropylene glycol. In some embodiments the diamine has the following structure: $H_2NR^1NH_2$, where $R^1$ is at least one of an aliphatic, cycloaliphatic and aromatic hydrocarbon having from 2 to 20 carbon atoms. In some embodiments the diamine has the following structure: $H_2NR^1NR^1H$, where $R^1$ is at least one of an aliphatic, cycloaliphatic and aromatic hydrocarbon having from 2 to 20 carbon atoms. In some embodiments the diamine has the following structure: $HR^4NR^4NR^4H$, where $R^4$ is at least one of an aliphatic, cycloaliphatic and aromatic hydrocarbon having from 2 to 20 carbon atoms. The $R^4$ groups on the two ends can cyclize as is the case with piperazine. Other examples include, but are not limited to, aminoethylpiperazine (mixed primary and secondary diamine); 4,4'-(1, 3-propanediyl)bispiperidine; 1,3-Di-4-piperidylpropane available under the trade designation "DIPIP" from Vertellus Industrial Specialties, Indianapolis, Ind.; a cycloaliphatic bis (secondary amine) available under the trade designation "JEFFLINK 754 DIAMINE" from Huntsman International, LLC, Salt Lake City, Utah, and an aliphatic secondary diamine available under the trade designation "CLEARLINK 1000" from Dorf Ketal, Houston, Tex. Combinations of two or more of the various diamines may be used. In some embodiments, secondary diamines may be used alone or in combination with primary diamines. Secondary amines may help reduce the density of the H-bond network which can contribute to improve toughening. By varying the ratio of primary diamine and secondary diamine, one can alter the mechanical properties, e.g., modulus, of the cured, curable composition.

In some embodiments, the number average molecular weight of the diamine is between from 60 g/mol to 10000 g/mol, between from 60 g/mol to 5000 g/mol, between from 60 g/mol to 4000 g/mol, between from 60 g/mol to 3000 g/mol, between from 100 g/mol to 10000 g/mol, between from 100 g/mol to 5000 g/mol, between from 100 g/mol to 4000 g/mol, between from 100 g/mol to 3000 g/mol, between from 200 g/mol to 10000 g/mol, between from 200 g/mol to 5000 g/mol, between from 200 g/mol to 4000 g/mol or even between from 200 g/mol to 3000 g/mol. The amine groups of the diamine may be at least one of a primary amine and a secondary amine. In some embodiments, the amine groups of the diamine may both be primary amines. In some embodiments, the amine groups of the diamine may both be secondary amines. In some embodiments, the amine groups of the diamine may be a primary amine and a secondary amine. Mixtures of amines having two primary amines, two secondary amines or a primary and a secondary amine may be used.

The polyamide resins of the present disclosure may be formed following a conventional condensation reaction between at least one dicarboxylic acid and at least one diamine. Mixtures of at least two dicarboxylic acid types with at least one diamine, mixtures of at least two diamine types with at least one dicarboxylic acid or mixtures of at least two dicarboxylic acid types with at least two diamine types may be used. The polyamide resins of the present disclosure are amine terminated and includes amine endgroups. Amine termination can be obtained by using the appropriate stoichiometric ratio of amine groups to acid groups, e.g., the appropriate stoichiometric ratio of diamine and dicarboxylic acid during the synthesis of the polyamide. In some embodiments, the mole ratio of diamine to dicarboxylic acid is between from 1.01/1.00 to 2.00/1.00, between from 1.01/1.00 to 1.90/1.00, between from 1.01/1.00 to 1.80/1.00, between from 1.01/1.00 to 1.70/1.00, between from 1.01/1.00 to 1.60/1.00, between from 1.01/1.00 to 1.50/1.00, between from 1.01/1.00 to 1.40/1.00, between from 1.05/1.00 to 2.00/1.00, between from 1.05/1.00 to 1.90/1.00, between from 1.05/1.00 to 1.80/1.00, between from 1.05/1.00 to 1.70/1.00, between from 1.05/1.00 to 1.60/1.00, between from 1.05/1.00 to 1.50/1.00, between from 1.05/1.00 to 1.40/1.00, between from 1.10/1.00 to 2.00/1.00, between from 1.10/1.00 to 1.90/1.00, between from 1.10/1.00 to 1.80/1.00, between from 1.10/1.00 to 1.70/1.00, between from 1.10/1.00 to 1.60/1.00, between from 1.10/1.00 to 1.50/1.00 or even between from 1.10/1.00 to 1.40/1.00.

In some embodiments, the amine end groups of the polyamide resin may include between from 1 mole percent to 100 mole percent, between from 10 mole percent to 100 mole percent, between from 20 mole percent to 100 mole percent between from 30 mole percent to 100 mole percent, between from 40 mole percent to 100 mole percent, between from 50 mole percent to 100 mole percent, between from 60 mole percent to 100 mole percent or even between from 70 mole percent to 100 mole percent of primary amine endgroups.

In some embodiments, the amine number of the polyamide resin may be between from 1 to 80 mg KOH/g, between from 2 to 22 mg KOH/g or even between from 5 to 15 mg KOH/g.

The polyamide resins of the present disclosure are capable of curing the curable compositions of the present disclosure without the use of catalyst or other cure agents. In some embodiments, a secondary cure agent may be used.

The polyamide resins of the present disclosure, which contain the dicarboxylic dimer acid at least a mole fraction of 0.1, based on the total moles of dicarboxylic acid used to form the polyamide resin, have unique properties compared to polyamides that do not include the dicarboxylic dimer acid. The polyamide resins are characterized by low or a complete lack of crystallinity, low softening points and, generally, low transition temperature ranges (melting temperature and low glass transition temperature). These properties contrast the highly crystalline nylon based polyamides known in the art that typically are highly crystalline with high melting temperatures. In some embodiments, the polyamide resin is a non-crystalline polyamide resin. It has been found that when the polyamide resins of the present disclosure are used as a curative for the benzoxazine resins (e.g., bisphenol-A-benzoxazine and/or bisphenol-F-benzoxazine) the resulting cured composition has surprisingly high glass transition temperatures, above 220° C., 230° C. or even above 240° C. and improved flexibility and toughness. The resulting properties make the curable compositions suitable for a variety of applications (e.g., use as a high temperature protective coating for metals. In some embodiments, the polyamide resin is a liquid at room temperature. In some embodiments, the polyamide resin is a solid (e.g., a powder or pellets) at room temperature.

Useful commercially available polyamide resins include those available under the trade designation MACROMELT (e.g., MACROMELT OM 633, MACROMELT OM 641, MACROMELT OM 652, MACROMELT OM 673, MACROMELT OM 6208, MACROMELT 7001, MACROMELT 7002, MACROMELT 7003) from Henkel Corp., Rocky Hill, Conn.; those available under the trade designation UNI-REZ (e.g., UNI-REZ 2600, UNI-REZ 2620, UNI-REZ 2700, and UNI-REZ 2720) from Arizona Chemical LLC, Jacksonville, Fla.; and those available under the trade designation VERSAMID (e.g., VERSAMID 100 and VERSAMID 115×70) from Gabriel Performance Chemicals, Ashtabula, Ohio. Other useful polyamide reins are disclosed in U.S. Pat. Nos. 3,377,303 (Peerman et al.); 3,242,141 (Vertnik et al.); and 3,483,237 (Vertnik et al.).

While FIG. 1 shows a 7-layer multilayer film, it is envisaged that additional layers (e.g., 9 layers, eleven layers, thirteen layers, or any other odd number of layers) can also be included in the film by adding alternating layers with a relatively lower loss modulus (e.g., as in the second layer) and relatively higher loss modulus (e.g., as in the third layer).

The multilayer film may have any thickness. In some embodiments, it is in the range of 10 to 600 microns, more preferably 50-270 microns, more preferably 150-200 microns. Likewise, the individual layers that make up the multilayer film may have any desired thickness. For example, in some embodiments, the odd (first, third, etc.) layers are 20-30 microns and the even (second, fourth, etc.) layers 1.5 to 2.5 microns.

If desired, one or more of the layers in the multilayer film may include other ingredients such as opacifying pigments, colorants, mineral fillers, stabilizers, lubricants, UV absorbers, processing aids, and other additives as desired. Exemplary useful UV absorbers include benzophenones, benzotriazoles, and triazines. Useful fillers include clay, silica, talc, mica, wallostonite, barium sulfate, and calcium carbonate. If desired, useful antioxidants can be used and include phenolic antioxidants, while useful photostabilizers include organic phosphates, and organotin thiolates (mercaptides). Useful lubricants include metal stearates, paraffin oils and waxes.

In some preferred embodiments, the multilayer film is uniaxially-oriented or biaxially-oriented, although this is not a requirement. Orientation can affect such properties as tensile strength, toughness, heat stability, tear initiation resistance, and effectiveness as a gas barrier In some preferred embodiments, the multilayer film has a transparency of at least 90 percent, preferably at least 95 percent, more preferably at least 97 percent, even more preferably at least 99 percent, if viewed parallel to the thickness of the multilayer film, although this is not a requirement.

In some preferred embodiments, the multilayer film has a transmission haze of less than 5 percent, more preferably less than 4 percent, more preferably less than 3 percent, and even more preferably less than 1 percent, if viewed parallel to the thickness of the multilayer film, although this is not a requirement.

The multilayer film of the present application may be manufactured using any known method.

Coextrusion is a known method of manufacturing films. Coextrusion means, for the present application, the simultaneous melt processing of multiple molten streams and the combination of such molten streams into a single unified structure, or coextruded film, for example from a single extrusion die.

The process is run generally by processing the feedstocks at or above their melt temperature through the die, resulting in the coextruded film. A coextruded film is generally a composite of all the molten feedstocks placed within the co-extrusion process. The resulting co-extruded films are generally multilayer. The layers are in contact with one another in the molten state. In certain embodiments, the layers are in contact throughout the extrusion, for example they are in contact within the die.

Alternatively, the multilayer film may be manufactured by consecutive in-line extrusion, wherein a layer is extruded onto the stack one at a time, or any combination of coextrusion and in-line extrusion. The multilayer film may additionally be manufactured by laminating the layers together as is known in the art. Additionally, the multilayer film may be manufactured by any combination of coextrusion, in-line extrusion, and lamination.

The coextruded multilayer film may further be processed, for example, by orientation. One example of orientation of a film is biaxial orientation. Biaxial orientation involves stretching the film in two directions perpendicular to each other, generally in the down-web direction and cross-web direction. In a typical operation, the freshly extruded molten film is fed onto a chill roll to produce a quenched amorphous film which is briefly heated and stretched in the down-web direction, and then conducted through a tenter frame where it is stretched transversely with moderate heating. Down-web direction stretching may be accomplished by passing between two sets of nip rolls, the second set rotating at a higher speed than the first. Biaxial orientation may be simultaneous or sequential.

Further details concerning coextrusion can be found, for example, in U.S. Pat. No. 3,565,985 (Schrenk et al.), 3,555,128 (Schrenck), 3,448,183 (Chisholm), and 4,405,547 (Koch et al.).

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

In the Examples all loss modulus values are according to ASTM Test Method D5026-15 at one hertz and 25° C., unless otherwise specified.

Table 1, below, reports materials used in the Examples.

TABLE 1

| ABBREVIATION | DESCRIPTION |
|---|---|
| R1 | LASER + C 9921 copolyester from DAK Americas LLC, Charlotte, North Carolina (loss modulus = 170.7 MPa at 1 Hz and 25° C.) |
| R2 | EASTAR COPOLYESTER GN071 copolyester, PETG (loss modulus = 21 MPa at 1 Hz and 25° C.), from Eastman Chemical Co., Kingsport, Tennessee |

TABLE 1-continued

| ABBREVIATION | DESCRIPTION |
|---|---|
| R3 | zinc ionomer of ethylene-methacrylic acid copolymer available as SURLYN 1652 IONOMER (loss modulus = 49 MPa at 1 Hz and 25° C.) from The Dow Chemical, Midland, Michigan |
| R4 | an ethylene-octene copolymer obtained as ENGAGE 8100 polyolefin elastomer from The Dow Chemical Co. (loss modulus = 0.5 MPa at 1 Hz and 25° C.) |
| R5 | an amine-terminated polyamide resin having an amine number of 5.6 mg KOH/g, prepared according to Table 1, No. 10 in col. 7, lines 14-28 of U.S. Pat. No. 3,377,303 (Peerman et al.). |
| R6 | Polyethylene terephthalate obtained as EASTMAN 7352 PET from Eastman Chemical Co., Kingsport, Tennessee, (loss modulus = 185 MPa at 1 Hz and 25° C.) |

Examples 1-6 and Comparative Examples A-E

Film cast sheets of ABCBA construction were made using three extruders all obtained from Leistritz Extrusionstechnik GMBH, Nuremberg, Germany. Layer A used an 18 mm twin-screw with a temperature profile of zone 1: 260° C., zone 2 and 3: 265° C., zone 4-6: 268° C., zone 7 and 8: 271° C. Layer B was a 27 mm twin-screw with a temperature profile of zone 1: 121° C., zone 2: 135° C., zone 3: 149° C., zone 4: 163° C., zone 5: 190° C., zone 6-8: 204° C. For samples with R4, layer B extruder's temperature profile was zone 1: 149° C., zone 2: 163° C., zone 3: 177° C., zone 4: 190° C., zone 5: 204° C., zone 6: 218° C., zone 7: 265° C., zone 8: 282° C. Layer C was a 25 mm twin-screw extruder with a temperature profile of zone 1: 232° C., zone 2: 246° C., zone 3: 254° C., zone 4: 260° C., zone 5: 265° C., zone 6—die: 271° C. All extrusion rates are provided in Table 2 in kg/hr. All thermoplastics in pellet form were fed into the twin screws with feeders (Model KCL24/KQX4 from Coperion K-Tron America, Pitman, N.J.). Table 2, below, reports descriptions of the film cast sheets made, wherein A=skin layers (first and fifth layers), B=connecting layers (second and fourth layers), and C=center layer (third layer).

TABLE 2

| | | EXAMPLE | | | | | | | | | |
|---|---|---|---|---|---|---|---|---|---|---|---|
| | | A | 1 | B | 2 | C | 3 | 4 | 5 | D | 6 | E |
| | | Film Thickness, mm | | | | | | | | | | |
| | | 0.39 | 0.40 | 0.40 | 0.39 | 0.45 | 0.39 | 0.34 | 0.35 | 0.36 | 0.37 | 0.41 |
| | | EXTRUSION RATE, kg/hr | | | | | | | | | | |
| A Layers | Resin R1 | 8.8 | 8.8 | 8.8 | 8.8 | 8.8 | 8.8 | 4.4 | 4.4 | 4.4 | 3.3 | 8.0 |
| | Resin R2 | 2.2 | 2.2 | 2.2 | 2.2 | 2.2 | 2.2 | 1.1 | 1.1 | 1.1 | 0.8 | 2.0 |
| B Layers | Resin R1 | 0 | 0 | 0 | 0 | 0 | 0 | 0 | 0 | 0 | 0 | 9.6 |
| | Resin R2 | 0 | 0 | 0 | 0 | 0 | 0 | 0 | 0 | 0 | 0 | 2.4 |
| | Resin R3 | 15 | 14 | 0 | 0 | 20 | 19.5 | 19.5 | 19 | 18 | 14.6 | 0 |
| | Resin R4 | 0 | 0 | 15 | 14 | 0 | 0 | 0 | 0 | 0 | 0 | 0 |
| | Resin R5 | 0 | 1 | 0 | 1 | 0 | 0.5 | 0.5 | 1 | 0 | 0.4 | 0 |
| C Layer | Resin R1 | 3.2 | 3.2 | 3.2 | 3.2 | 3.2 | 3.2 | 1.6 | 1.6 | 1.6 | 1.2 | 8.0 |
| | Resin R2 | 0.8 | 0.8 | 0.8 | 0.8 | 0.8 | 0.8 | 0.4 | 0.4 | 0.4 | 0.3 | 2.0 |

The film cast sheets of Examples 1-11 were tested for tensile properties and Elmendorf Tear Resistance by the specified methods. Table 3 reports mechanical properties obtained for these film cast sheets. Incorporation of the adhesion promoter increased interlayer adhesion between B and skin (A) layers and between B and center (C) layers. It was difficult to quantify the adhesion level, but the layers could not be separated with assistance of a strong adhesive tape and fast pull, nor were they separated during thermoforming or stretching.

TABLE 3

| EXAMPLE | FILM THICKNESS, mm | MD Tensile Modulus, MPa | TD Tensile Modulus, MPa | MD Tensile Strength, MPa | TD Tensile Strength, MPa | MD Elongation at Break, % | TD Elongation at Break, % | MD Elmendorf Tear Force, kN/m | TD Elmendorf Tear Force, kN/m |
|---|---|---|---|---|---|---|---|---|---|
| A | 0.39 | 611 | 722 | 33 | 35 | 508 | 525 | 28.2 | 28.6 |
| 1 | 0.40 | 683 | 684 | 35 | 35 | 499 | 532 | 28.6 | 26.3 |
| B | 0.40 | 556 | 556 | 24 | 24 | 492 | 486 | 5.4 | 6.9 |
| 2 | 0.39 | 576 | 574 | 22 | 22 | 513 | 509 | 6.6 | 6.2 |
| C | 0.45 | 600 | 605 | 30 | 27 | 509 | 505 | 27.8 | 23.9 |
| 3 | 0.39 | — | — | — | — | — | — | 21.6 | 25.9 |
| 4 | 0.34 | — | — | — | — | — | — | 22.4 | 21.6 |
| 5 | 0.35 | 417 | 387 | 29 | 26 | 560 | 512 | 19.7 | 20.8 |
| D | 0.36 | — | — | — | — | — | — | 13.1 | 17.0 |
| 6 | 0.37 | — | — | — | — | — | — | 17.0 | 18.9 |
| E | 0.41 | 1646 | 1552 | 52 | 48 | 306 | 78 | 9.3 | 9.3 |

The film cast sheets of Examples 1-6 and Comparative examples A-E were also tested for haze and transmission by the specified method. All exhibited a light transmission near 92% and many exhibited a haze level below 2%. Results are reported in Table 4, below.

TABLE 4

| EXAMPLE | FILM THICKNESS, mm | TRANSMISSION, % | HAZE, % |
|---|---|---|---|
| A | 0.39 | 92.6 | 3.4 |
| 1 | 0.40 | 92.2 | 1.8 |
| B | 0.40 | 91.9 | 2.9 |
| 2 | 0.39 | 91.7 | 50.0 |
| C | 0.45 | 92.4 | 1.5 |
| 3 | 0.39 | 92.2 | 1.7 |
| 4 | 0.34 | 92.5 | 1.6 |
| 5 | 0.35 | 92.3 | 1.8 |
| D | 0.36 | 92.5 | 2.4 |
| 6 | 0.37 | 92.0 | 35.8 |
| E | 0.41 | 92.3 | 6.1 |

Example 7

A film made from the cast sheet of Example 1 was thermoformed using a pressure molding machine for dental devices, BIOSTAR VI (Scheu-Dental GmbH, Iserlohn, Germany). The film cast sheet was die cut into a 125 mm diameter disk. The disk was placed on the BIOSTAR and heated, using an IR heater, to 150° C. before being thermoformed against a 3D printed mold of an aligner tray under a pressure of 91 psi (627 kPa). The thermoformed tray was then trimmed using an ultrasonic cutter and removed from the 3D printed mold by hand.

Examples 8 and 9

Film cast sheets of ABCBA construction were made using three extruders all obtained from Leistritz Extrusionstechnik GMBH, Nuremberg, Germany. Layer A used an 18 mm twin-screw with a temperature profile of zone 1: 260° C., zone 2 and 3: 265° C., zone 4-6: 268° C., zone 7 and 8: 271° C. Layer B was a 27 mm twin-screw with a temperature profile of zone 1: 121° C., zone 2: 135° C., zone 3: 149° C., zone 4: 163° C., zone 5: 190° C., zone 6-8: 204° C. Layer C was a 25 mm twin-screw extruder with a temperature profile of zone 1: 232° C., zone 2: 246° C., zone 3: 254° C., zone 4: 260° C., zone 5: 265° C., zone 6—die: 271° C. All extrusion rates are provided in Table 5 in kg/hr. All thermoplastics in pellet form were fed into the twin screws with feeders (Model KCL24/KQX4 from Coperion K-Tron America, Pitman, N.J.). Final film cast sheet thicknesses ranged from 52 mil to 55 mil (1.32 mm to 1.40 mm). Table 5, below, reports descriptions of the film cast sheets made, wherein A=skin layers (first and fifth layers), B=connecting layers (second and fourth layers), and C=center layer (third layer).

TABLE 5

| | | EXAMPLE | |
|---|---|---|---|
| | | 8 | 9 |
| | | Thickness, mm | |
| | | 1.32 | 1.37 |
| | | Extrusion Rate, kg/hr | |
| A Layers | Resin R1 | 4.0 | 2.0 |
| | Resin R2 | 1.0 | 0.5 |
| B Layers | Resin R3 | 8.8 | 8.6 |
| | Resin R5 | 0.2 | 0.5 |
| C Layer | Resin R1 | 1.5 | 0.7 |
| | Resin R2 | 0.4 | 0.2 |

Example 10-19

Squares of 100 mm by 100 mm were cut from the original film cast sheets. The squares were loaded and stretched using a laboratory biaxial film stretcher (KARO IV from Bruckner Maschinenbau GmbH & Co. KG, Siegsdorf, Germany). Temperatures ranging from 95° C. to 130° C. were used as set points in all zones of the machine, as indicated in Table 6, and the fan speed setting was set to 50%. Film cast sheets were simultaneously biaxially stretched at a speed of 10%/second. A pre-heat of 45 seconds and a post-heat of 30 seconds were used. During the post-heat the film is held, clamped at the maximum stretch reached during the cycle. Thickness of the finished stretched film was measured with a caliper gauge. Table 6, below, reports the process conditions to make the stretched (oriented) films.

TABLE 6

| EXAMPLE | FILM THICKNESS, Mils (microns) | STRETCH RATIO MD × TD | STRETCH TEMPERATURE, ° C. |
|---|---|---|---|
| 10 | 16.0 (406) | n/a | n/a |
| 11 | 14.0 (355) | n/a | n/a |
| 12 | 6.0 (152) | 2.5 × 2.5 | 110 |
| 13 | 6.5 (165) | 2.5 × 2.5 | 120 |

TABLE 6-continued

| EXAMPLE | FILM THICKNESS, Mils (microns) | STRETCH RATIO MD × TD | STRETCH TEMPERATURE, ° C. |
|---|---|---|---|
| 14 | 7.5 (190) | 2.5 × 2.5 | 95 |
| 15 | 6.0 (152) | 2.5 × 2.5 | 110 |
| 16 | 6.5 (165) | 2.5 × 2.5 | 120 |
| 17 | 7.0 (178) | 2.5 × 2.5 | 130 |
| 18 | 3.0 (76) | 4.0 × 4.0 | 120 |
| 19 | 1.7 (43) | 5.0 × 5.0 | 120 |

Example 20-22

A thirteen-layer film was made using two twin screw extruders each with individual gravimetric feeders. The first extruder (A layer) was a fixed 40 mm from Berstorff, Germany with a K-tron twin screw feeder from Coperion GmbH, Stuttgart, Germany. The second extruder was a portable 25 mm from Berstorff, Germany, with a portable K-Tron compact gravimetric feeder from Coperion GmbH. The extruders temperature profile was, zone 1: 176.7° C., zone 2: 204.4° C., zone 3: 232.2° C., zone 4: 260° C., zone 5-8: 273.9° C. The feedblock and die were also held at 273.9° C. The film was drawn out of the die at a rate of approximately 3.6 fpm and was then length oriented (Killion Davis Standard, Hartford, Conn.) where rolls 1 and 3 were set at 79.5° C., rolls 2 and 4 were set at 82° C., and roll 5 was set at 54.5° C. Following the length orientation, the film was oriented in the transverse direction via a tenter (Cellier/Bruckner, Germany), where zone 1: 87.8° C., zone 2: 93.3° C., zone 3: 98.9° C., zones 4-6: 107.2° C., and zone 7 and 8: 121.1° C. Final film thickness after orientation ranged from 0.12 to 0.14 mm. Table 7, below, provides descriptions of the thirteen layer films wherein the layers alternate such that layer A=odd numbered layers, and the layer B=even numbered layers.

TABLE 7

| | | EXAMPLE | | |
|---|---|---|---|---|
| | | 20 | 21 | 22 |
| | | Thickness, mm | | |
| | | 0.12 | 0.11 | 0.14 |
| | | Extrusion Rate, kg/hr | | |
| A Layers | Resin R2 | 3.3 | 3.3 | 3.3 |
| | Resin R6 | 13.0 | 13.0 | 13.0 |
| B Layers | Resin R2 | 1.3 | 1.3 | 1.3 |
| | Resin R5 | 0.07 | 0.07 | 0.07 |
| Stretch Ratio MD × TD | | 2.5 × 3.6 | 2.5 × 4.1 | 2.5 × 3.25 |

Examples 20-22 were tested for tensile properties and Elmendorf Tear Resistance by the specified methods (Table 8) as well has Transmission and Haze (Table 9).

TABLE 8

| EXAMPLE | FILM THICKNESS, mm | MD Tensile Modulus, MPa | TD Tensile Modulus, MPa | MD Tensile Strength, MPa | TD Tensile Strength, MPa | MD Elongation at Break, % | TD Elongation at Break, % | MD Elmendorf Tear Force, kN/m | TD Elmendorf Tear Force, kN/m |
|---|---|---|---|---|---|---|---|---|---|
| 20 | 0.12 | 2266 | 3086 | 115 | 116 | 141 | 68 | 191.3 | 250.9 |
| 21 | 0.11 | 2270 | 3711 | 115 | 138 | 152 | 64 | 150.3 | 255.7 |
| 22 | 0.14 | 2399 | 3151 | 108 | 116 | 127 | 46 | 77.5 | 224.8 |

TABLE 9

| EXAMPLE | FILM THICKNESS, mm | TRANSMISSION, % | HAZE, % |
|---|---|---|---|
| 20 | 0.12 | 90.1 | 3.03 |
| 21 | 0.11 | 90.7 | 1.64 |
| 22 | 0.14 | 90.5 | 2.13 |

All cited references, patents, and patent applications in this application are incorporated by reference in a consistent manner. In the event of inconsistencies or contradictions between portions of the incorporated references and this application, the information in this application shall control. The preceding description, given in order to enable one of ordinary skill in the art to practice the claimed disclosure, is not to be construed as limiting the scope of the disclosure, which is defined by the claims and all equivalents thereto.

What is claimed is:

1. A multilayer film comprising:
   a first layer, wherein the first layer is thermoplastic, comprises at least one aromatic polyester, and has a loss modulus at 1 hertz and 25° C. of at least 70 megapascals;
   a second layer contacting the first layer, wherein the second layer is thermoplastic and has a loss modulus at 1 hertz and 25° C. of less than or equal to 60 megapascals, and comprises:
   a thermoplastic elastomer; and
   a polyamide resin that is a reaction product of:
   (i) a dicarboxylic acid, wherein the dicarboxylic acid includes a non-aromatic, dicarboxylic dimer acid and the mole fraction of the non-aromatic, dicarboxylic dimer acid is between from 0.10 to 1.00, based on the total moles of dicarboxylic acid used to form the polyamide resin; and
   (ii) a diamine, and wherein the polyamide resin is amine-terminated and includes amine end-groups; and
   a third layer contacting the second layer, wherein the third layer is thermoplastic, comprises at least one aromatic polyester, and has a loss modulus at 1 hertz and 25° C. of at least 70 megapascals; and
   wherein the second layer is sandwiched between the first and third layers.

2. The multilayer film of claim 1, wherein the second layer is substantially elastic in response to a tensile elongation of at least 10 percent.

3. The multilayer film of claim 1, wherein the multilayer film has a transparency of at least 90 percent if viewed parallel to the thickness of the multilayer film.

4. The multilayer film of claim 1, wherein the multilayer film has a transmission haze of less than 5 haze percent if viewed parallel to the thickness of the multilayer film.

5. The multilayer film of claim 1, wherein the film is uniaxially-oriented or biaxially-oriented.

6. The multilayer film of claim 1, wherein the at least one first thermoplastic polymer comprises polyethylene terephthalate.

7. The multilayer film of claim 1, wherein the at least one first thermoplastic polymer comprises a glycol-modified polyethylene terephthalate.

8. The multilayer film of claim 1, wherein the at least one first thermoplastic polymer comprises a blend of polyethylene terephthalate and glycol-modified polyethylene terephthalate in a respective weight ratio of 4:1 to 9:1.

9. The multilayer film of claim 1, wherein the thermoplastic elastomer comprises at least one of an ionomeric elastomer, a thermoplastic polyurethane elastomer, a thermoplastic polyester elastomer, a thermoplastic copolyesters elastomer, a thermoplastic polyether block amide elastomer, a styrenic block copolymer elastomer, an elastomeric copolymer of ethylene and propylene, or an ethylene-vinyl acetate elastomer.

10. The multilayer film of claim 1, further comprising a fourth layer and a fifth layer, wherein the fourth layer is sandwiched between the third layer and the fifth layer, wherein second and fourth layers have the same composition, and wherein the first, third and fifth layers have the same composition.

11. The multilayer film of claim 10, further comprising a sixth layer and a seventh layer, wherein the fourth layer is sandwiched between the fifth layer and the seventh layer, wherein second, fourth, and six layers have the same composition, and wherein the first, third, fifth, and seventh layers have the same composition.

12. The multilayer film of claim 1, wherein the number average molecular weight of the non-aromatic, dicarboxylic dimer acid is between from 300 g/mol to 1400 g/mol.

13. The multilayer film of claim 12, wherein the number of carbon atoms in the non-aromatic, dicarboxylic dimer acid is between from 12 to 100.

14. A method of making a multilayer film, the method comprising coextruding first, second, and third layers, wherein:

the first layer is thermoplastic, comprises at least one aromatic polyester, and has a loss modulus at 1 hertz and 25° C. of at least 70 megapascals;

the second layer contacts the first layer, and wherein the second layer is thermoplastic and has a loss modulus at 1 hertz and 25° C. of less than or equal to 60 megapascals, and comprises:

a thermoplastic elastomer; and a polyamide resin that is a reaction product of:

(i) a dicarboxylic acid, wherein the dicarboxylic acid includes a non-aromatic, dicarboxylic dimer acid and the mole fraction of the non-aromatic, dicarboxylic dimer acid is between from 0.10 to 1.00, based on the total moles of dicarboxylic acid used to form the polyamide resin; and (ii) a diamine, and wherein the polyamide resin is amine-terminated and includes amine end-groups; and the third layer that is thermoplastic, has a loss modulus at 1 hertz and 25° C. of at least 70 megapascals, and comprises at least one aromatic polyester; and wherein the second layer is sandwiched between the first and third layers.

\* \* \* \* \*